April 15, 1930. L. S. GORDON 1,754,357
CAMERA
Filed March 16, 1928 2 Sheets-Sheet 1
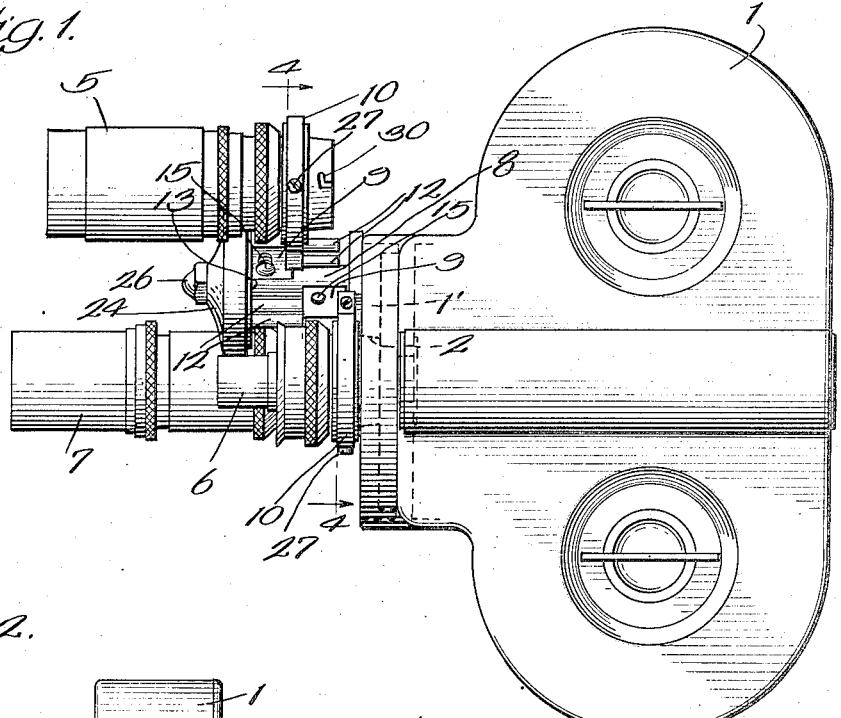
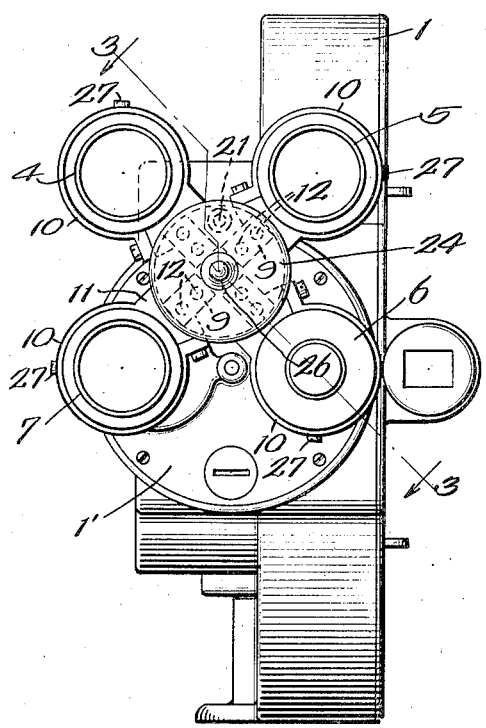
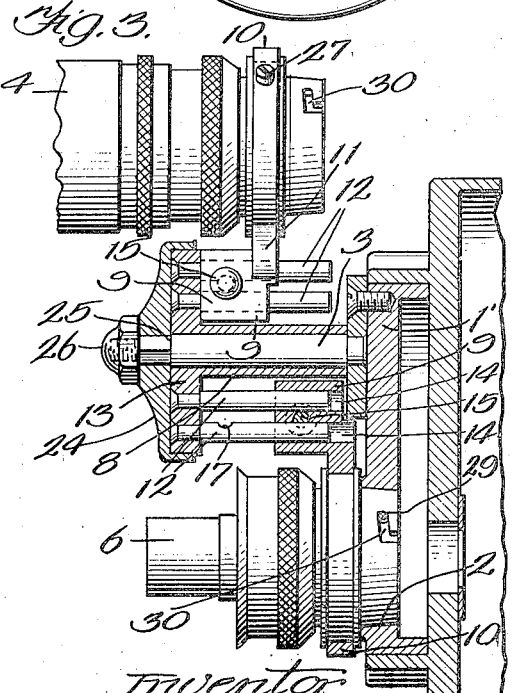
Inventor
Leslie S. Gordon April 15, 1930.  L. S. GORDON  1,754,357
CAMERA
Filed March 16, 1928  2 Sheets-Sheet 2
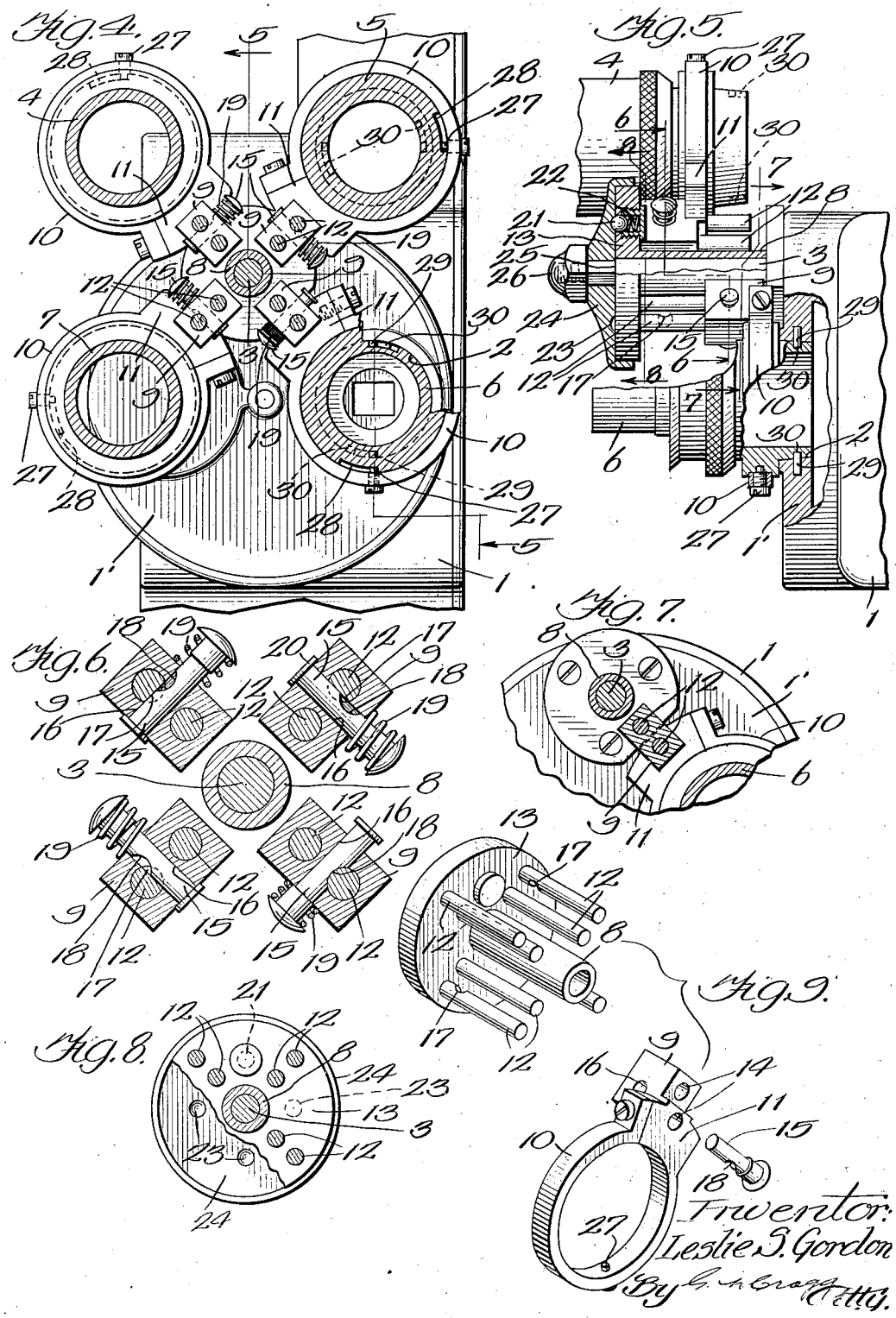

Patented Apr. 15, 1930

1,754,357

UNITED STATES PATENT OFFICE

LESLIE S. GORDON, OF CHICAGO, ILLINOIS

CAMERA

Application filed March 16, 1928. Serial No. 262,091.

My invention relates to cameras of the class employing lens tubes which are provided upon mountings that are adjustable to bring the lens tubes into and out of register with light transmitting openings provided in the camera chambers.

A camera constructed in accordance with the preferred embodiment of my invention employs a mounting for the tube in which the tube may be turned upon the tube axis and having a support located upon one side of the light transmitting opening in the camera chamber and defining an axis of rotation for the mounting positioned to include the axis of said opening in the circle of rotation of the axis of said tube whereby the tube is adjustable into and out of register with said light transmitting opening. The lens tube is desirably adjustable along its axis into and out of the light transmitting opening in which event I provide cooperating bayonet pin and slot formations, one upon the lens tube and one upon the camera chamber and effectively engageable when the lens tube is in said opening, and coacting stop formations, one upon the lens tube and one upon the tube mounting and relatively positioned to be engageable when the lens tube is positioned and turned upon its own axis to bring the aforesaid bayonet pin and the entrance branch of the bayonet slot into register. I also desirably provide two coacting stop formations, one upon the lens tube and one upon the tube mounting and relatively positioned to be engageable when the lens tube is turned upon its own axis to bring the bayonet pin and the entrance branch of the bayonet slot out of register to a predetermined extent. By this arrangement, the lens tube is confined to a small arc of rotation about its own axis and this movement is arrested when the bayonet pin is in register with the entrance branch of the bayonet slot so that the user will have no difficulty in properly adjusting the tube preparatory to the locking engagement thereof with the camera chamber when the tube is within the light transmitting opening that is provided in the chamber.

In accordance with another feature of the invention, the tube mounting is inclusive of a bracket which holds the tube and a bracket support extending along the tube axis whereby the tube is adjustable into alternative positions along its axis toward and from the camera chamber, and means for locking said bracket and bracket support in fixed relation when said tube is in one of its alternative positions. The means for locking the bracket and its support is desirably inclusive of a pin carried upon and slidable transversely of the bracket, the bracket support having a notch receiving said pin to lock the bracket and support together, said pin having a notch which is brought into register with and receives the bracket support upon suitable movement of the pin to permit movement of the bracket along its support. Readily releasable means are desirably also provided for positively holding the lens tube mounting in one and preferably in each position to which it may be moved.

The invention will be more fully explained in connection with the accompanying drawing in which Fig. 1 is a side elevation of the preferred embodiment of the invention; Fig. 2 is a front elevation of the camera shown in Fig. 1; Fig. 3 is a sectional view on line 3—3 of Fig. 2; Fig. 4 is a sectional view on line 4—4 of Fig. 1, on a larger scale; Fig. 5 is a sectional view on line 5—5 of Fig. 4; Fig. 6 is a sectional view on line 6—6 of Fig. 5; Fig. 7 is a sectional view on line 7—7 of Fig. 5; Fig. 8 is a sectional view on line 8—8 of Fig. 5; and Fig. 9 is a perspective view illustrating some of the normally assembled parts in separated relation.

The camera illustrated includes a chamber 1 which contains winding and supply reels and a film which is wound about the winding reel as it is withdrawn from the supply reel. Cameras of the type illustrated may also be provided with mechanism whereby the reels may be caused to travel step by step to take so-called moving pictures. The front wall 1' of the camera chamber is desirably circular and contains a conically tapering light transmitting opening 2 which is located between the center of said chamber wall and the periphery thereof. A shaft 3 is fixed upon the chamber wall 1' at one side of the light transmitting opening 2 and extends along the axis of this opening, this shaft projecting forwardly from the camera chamber and constituting a support for the mounting that carries a plurality of lens tubes 4, 5, 6 and 7. This lens tube mounting is inclusive of a hub portion 8 which is journaled upon the shaft 3. This shaft is so positioned as to define an axis of rotation for the lens tube mounting which is positioned to include the axis of the opening 2 in the circle of rotation of the axes of the lens tubes, these lens tube axes being equidistant from the axis of said shaft, that is, they are upon a common circle whose center is contained in the shaft axis, the axis of the opening 2 being also spaced a distance from the shaft axis equal to the distance between this axis and each of the tube axes. By this arrangement, any one of the tubes is adjustable into and out of register with said light transmitting opening.

The lens tube mounting is also inclusive of a number of brackets 9, each lens tube having a bracket individual thereto and each bracket being inclusive of a ring portion 10 in which the corresponding tube is snugly and slidably received. Each bracket also includes a base portion 11 from which the corresponding ring portion extends. The hub portion 8 of the lens tube mounting also carries a number of bracket supports, one for each bracket. Each bracket support is desirably inclusive of two rods 12 which extend along the axis of the shaft 3 toward the camera chamber, these rods being carried at their outer ends in a disc 13 which is an integral continuation of the hub portion 8. The base portions 11 of the brackets are provided with holes 14 which extend therethrough along the axis of the shaft 3, these holes snugly receiving said rods but permitting the brackets to be moved along the rods toward and from the camera chamber to bring any selected tube into and out of the opening 2 when such tube is in register with this opening.

The brackets are desirably locked in their outermost positions when the corresponding lens tubes are out of register with the aforesaid light transmitting opening. To this end, I provide means for locking each bracket and its support in fixed relation, each locking means being inclusive of a pin 15 carried upon the corresponding bracket base 11 and slidingly received in an opening 16 extending transversely of the bracket. Each bracket has a notch 17 in one of its rods 12 which is adapted to receive the corresponding pin 15 when the bracket and support are to be locked together when the corresponding lens tube is in its outermost position. Each pin 15 has a notch 18 which is normally out of register with the corresponding rod 12 that contains a notch 17 but which may be brought into register with this rod by a suitable movement of the pin to permit the corresponding bracket to be moved, together with the lens tube thereon, along the axis of this tube in adjusting such tube toward and from the camera chamber. Each pin has a spring 19 surrounding the same and interposed between the head of this pin and the bracket. Such spring, when free to function, presses upon the corresponding pin in a direction to bring the notch 18 therein out of register with the corresponding rod 12 and to bring the pin into the corresponding notch 17 when the pin is in register with the latter notch. The extent to which each spring 19 may thus move the pin 15 is limited by a flange 20 which is provided at the other end of the pin. As is understood, each pin is received in the corresponding notch 17 when the corresponding bracket and the lens tube on this bracket are in their outermost position. When the lens tube mounting has been turned to bring a selected lens tube into register with the light transmitting opening 2, the pin 15 corresponding to this lens tube is manually depressed against the force of the spring 19 to bring the notch 18 into register with the rod 12 that contains a notch 17 whereafter the bracket that is equipped with this particular pin may be moved along the corresponding rod 12 to bring the corresponding tube into the light transmitting opening 2.

In order that the lens tubes may be accurately placed in register with the light transmitting opening 2, I provide a plunger 21 upon the disc 13 and a spring 22 also upon this disc, this spring serving to press said plunger outwardly and into one of the several sockets 23 which are provided in a circular row upon the abutment 24 which is fixed upon the outer end of the stationary shaft 3 and is clamped against the shoulder 25 upon this shaft by a nut 26 which is screwed upon the outer end of this shaft.

Each lens tube is adapted to be turned within the ring portion 10 of its supporting bracket to a limited extent which is defined by a pin 27 upon the corresponding ring and an arcuate notch 28 in the corresponding lens tube. One end of this notch and the nearer side of the pin constitute two coacting stop formations which limit the extent to which the corresponding lens tube may be turned in one direction and the other end of this notch and the nearer side of the pin constitute two other coacting stop formations which limit the extent to which the corresponding lens tube may be turned in the reverse direction. One or more bayonet pins 29 are carried upon the camera chamber wall 1' and desirably project into the opening 2. The lens tubes are provided with bayonet slots 30 which cooperate with said bayonet pins to lock the tubes in their innermost positions. Each notch 28 is so disposed with respect to the corresponding bayonet slot 30 that the corresponding stop pin 27 is engageable with one end of said notch 28 when the lens tube is positioned and turned upon its own axis to bring the bayonet pins 29 and the entrance branch of the bayonet slots 30 of the selected lens tube into register so that the selected lens tube may be fully moved into the opening 2 with the assurance that the bayonet pins 29 will enter the bayonet slots 30 and with the further assurance that such tube may readily be withdrawn. The extent to which each lens tube may be moved when the bayonet pins 29 are in register with the transverse or holding branches of the bayonet slots is limited by these slots. The notches 28 also limit the degree of turning movement of the various tubes, the user knowing in which direction to turn the tubes to position them for holding engagement with the bayonet pins and to release them from such engagement.

Changes may be made without departing from the invention.

Having thus described my invention, I claim:

1. In a camera, the combination with the chamber thereof having a light transmitting opening; of a lens tube; a mounting for the tube in which the tube may be turned upon the tube axis and having a support located upon one side of said opening and defining an axis of rotation for the mounting positioned to include the axis of said opening in the circle of rotation of the axis of said tube whereby the tube is adjustable into and out of register with said light transmitting opening, said tube being adjustable along its axis into and out of said opening; cooperating bayonet pin and slot formations, one upon the lens tube and one upon the camera chamber and effectively engageable when the lens tube is in said opening; and coacting stop formations, one upon the lens tube and one upon the tube mounting and relatively positioned to be engageable when the lens tube is positioned and turned upon its own axis to bring the aforesaid bayonet pin and the entrance branch of the bayonet slot into register.

2. In a camera, the combination with the chamber thereof having a light transmitting opening; of a lens tube; a mounting for the tube in which the tube may be turned upon the tube axis and on which the lens tube is movable into and out of register with said opening, said tube being adjustable along its axis into and out of said opening; cooperating bayonet pin and slot formations, one upon the lens tube and one upon the camera chamber and effectively engageable when the lens tube is in said opening; and coacting stop formations, one upon the lens tube and one upon the tube mounting and relatively positioned to be engageable when the lens tube is positioned and turned upon its own axis to bring the aforesaid bayonet pin and the entrance branch of the bayonet slot into register.

3. In a camera, the combination with the chamber thereof having a light transmitting opening; of a lens tube; a mounting for the tube in which the tube may be turned upon the tube axis and having a support located upon one side of said opening and defining an axis of rotation for the mounting positioned to include the axis of said opening in the circle of rotation of the axis of said tube whereby the tube is adjustable into and out of register with said light transmitting, said tube mounting being inclusive of a bracket which holds the tube and a bracket support extending along the tube axis whereby the tube is adjustable into alternative positions along its axis toward and from the camera chamber; and means for locking said bracket and bracket support in fixed relation when said tube is in one of its alternative positions.

4. In a camera, the combination with the chamber thereof having a light transmitting opening; of a lens tube; a mounting for the tube in which the tube may be turned upon the tube axis and on which the lens tube is movable into and out of register with said opening, said tube mounting being inclusive of a bracket which holds the tube and a bracket support extending along the tube axis whereby the tube is adjustable into alternative positions along its axis toward and from the camera chamber; and means for locking said bracket and bracket support in fixed relation when said tube is in one of its alternative positions.

5. In a camera, the combination with the chamber thereof having a light transmitting opening; of a lens tube; a mounting for the tube having a support located upon one side of said opening and defining an axis of rotation for the mounting positioned to include the axis of said opening in the circle of rotation of the axis of said tube whereby the tube is adjustable into and out of register with said light transmitting opening; a socket member; and a spring plunger member receivable in the socket member one of these two members being provided upon the tube mounting and the other upon the camera chamber, the member upon the camera chamber being positioned to hold the tube mounting in a position to which it is turned.

6. In a camera, the combination with the chamber thereof having a light transmitting opening; of a lens tube; a mounting for the tube on which the lens tube is movable into and out of register with said opening; a socket member; and a spring plunger member receivable in the socket member, one of these two members being provided upon the tube mounting and the other upon the camera chamber, the member upon the camera chamber being positioned to hold the tube mounting in a position to which it is moved.

7. The structure of claim 1 wherein there are two coacting stop formations, one upon the lens tube and one upon the tube mounting and relatively positioned to be engageable when the lens tube is turned upon its own axis to bring the bayonet pin and the entrance branch of the bayonet slot out of register to a predetermined extent.

8. The structure of claim 2 wherein there are two coacting stop formations, one upon the lens tube and one upon the tube mounting and relatively positioned to be engageable when the lens tube is turned upon its own axis to bring the bayonet pin and the entrance branch of the bayonet slot out of register to a predetermined extent.

9. The structure of claim 3 wherein the means for locking the bracket and its support in fixed relation is inclusive of a pin carried upon and slidable transversely of the bracket, the bracket support having a notch receiving said pin to lock the bracket and support together, said pin having a notch which is brought into register with and receives the bracket support upon suitable movement of the pin to permit movement of the bracket along its support.

10. The structure of claim 4 wherein the means for locking the bracket and its support in fixed relation is inclusive of a pin carried upon and slidable transversely of the bracket, the bracket support having a notch receiving said pin to lock the bracket and support together, said pin having a notch which is brought into register with and receives the bracket support upon suitable movement of the pin to permit movement of the bracket along its support.

11. The structure of claim 3 wherein the means for locking the bracket and its support in fixed relation is inclusive of a pin carried upon and slidable transversely of the bracket the bracket support having a notch receiving said pin to lock the bracket and support together, said pin having a notch which is brought into register with and receives the bracket support upon suitable movement of the pin to permit movement of the bracket along its support and wherein a spring presses upon said pin in a direction to bring the notch in the pin out of register with the bracket support and to bring the pin into the notch in said support when the pin is in register with the latter notch.

12. The structure of claim 4 wherein the means for locking the bracket and its support in fixed relation is inclusive of a pin carried upon and slidable transversely of the bracket, the bracket support having a notch receiving said pin to lock the bracket and support together, said pin having a notch which is brought into register with and receives the bracket support upon suitable movement of the pin to permit movement of the bracket along its support and wherein a spring presses upon said pin in a direction to bring the notch in the pin out of register with the bracket support and to bring the pin into the notch in said support when the pin is in register with the latter notch.

In witness whereof, I hereunto subscribe my name.

LESLIE S. GORDON.